(12) United States Patent
Wörn et al.

(10) Patent No.: US 6,362,813 B1
(45) Date of Patent: Mar. 26, 2002

(54) CONTROL AND PROGRAMMING UNIT

(75) Inventors: Heinz Wörn, Derching; Erwin Hajdu, Augsburg, both of (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 08/983,265

(22) PCT Filed: Jul. 20, 1996

(86) PCT No.: PCT/EP96/03212

§ 371 Date: Dec. 22, 1997

§ 102(e) Date: Dec. 22, 1997

(87) PCT Pub. No.: WO97/04370

PCT Pub. Date: Feb. 6, 1997

(30) Foreign Application Priority Data

Jul. 22, 1995 (DE) ...................................... 295 11 864 U
Sep. 29, 1995 (DE) ......................................... 195 36 293

(51) Int. Cl.⁷ ................................................. G09G 5/00
(52) U.S. Cl. ...................... 345/169; 345/158; 345/161; 345/1.2; 345/2.1
(58) Field of Search ................................ 345/158, 161, 345/169, 1.2, 2.1

(56) References Cited

U.S. PATENT DOCUMENTS

| 4,348,142 A | | 9/1982 | Figour |
| 4,723,207 A | | 2/1988 | Isobe et al. |
| 4,888,708 A | | 12/1989 | Brantmark et al. |
| 4,959,802 A | * | 9/1990 | Slaughter et al. ............ 364/521 |
| 5,079,491 A | * | 1/1992 | Nose et al. ............ 318/568.11 |
| 5,115,179 A | | 5/1992 | Fujii et al. |
| 5,267,181 A | | 11/1993 | George |
| 5,307,055 A | * | 4/1994 | Baskin et al. .................. 345/1 |
| 5,432,510 A | | 7/1995 | Matthews |
| 5,850,206 A | * | 12/1998 | Lemke et al. ................ 345/156 |
| 5,880,956 A | * | 3/1999 | Graf ............................ 364/191 |
| 5,914,706 A | * | 6/1999 | Kono .......................... 345/173 |
| 6,001,015 A | * | 12/1999 | Nishiumi et al. .............. 463/38 |
| 6,020,881 A | * | 2/2000 | Naughton et al. ........... 345/327 |

FOREIGN PATENT DOCUMENTS

| EP | 0 303 708 | 2/1989 |
| EP | 0 310 958 | 4/1989 |
| EP | 0 535 622 | 4/1993 |
| GB | 2 204 426 | 11/1988 |
| WO | WO 95/12843 | 5/1995 |

OTHER PUBLICATIONS

Brantmark et al. 1982 Man/Machine communication in ASEA's new robot controller ASEA Journal, vol. 55, No. 6.

* cited by examiner

*Primary Examiner*—Steven Saras
*Assistant Examiner*—Alecia D. Nelson
(74) *Attorney, Agent, or Firm*—McGlew and Tuttle, P.C.

(57) ABSTRACT

The present invention pertains to a control and programming means (1) for a manipulator (2) with a manipulator control (3), a computer (4) with a graphics unit and with a portable programming device (10), which connected to the computing unit (4) by remote data transmission. The programming device (10) has a display screen (12) without a graphics card of its own, which is connected to the graphics unit (5) of the computer (4) by remote data transmission means and receives the graphic information from the said graphics unit. The graphics unit (5) preferably has a graphics card (6) with a converter (9) and an integrated serial interface (7) for remote data transmission for this purpose. The programming device (10) has a serial interface (7) for remote data transmission. The programming device (10) has a serial interface (7), which is connected to the display screen (12) via a converter (9).

19 Claims, 6 Drawing Sheets

CONTROL AND PROGRAMMING UNIT

Figure 1:
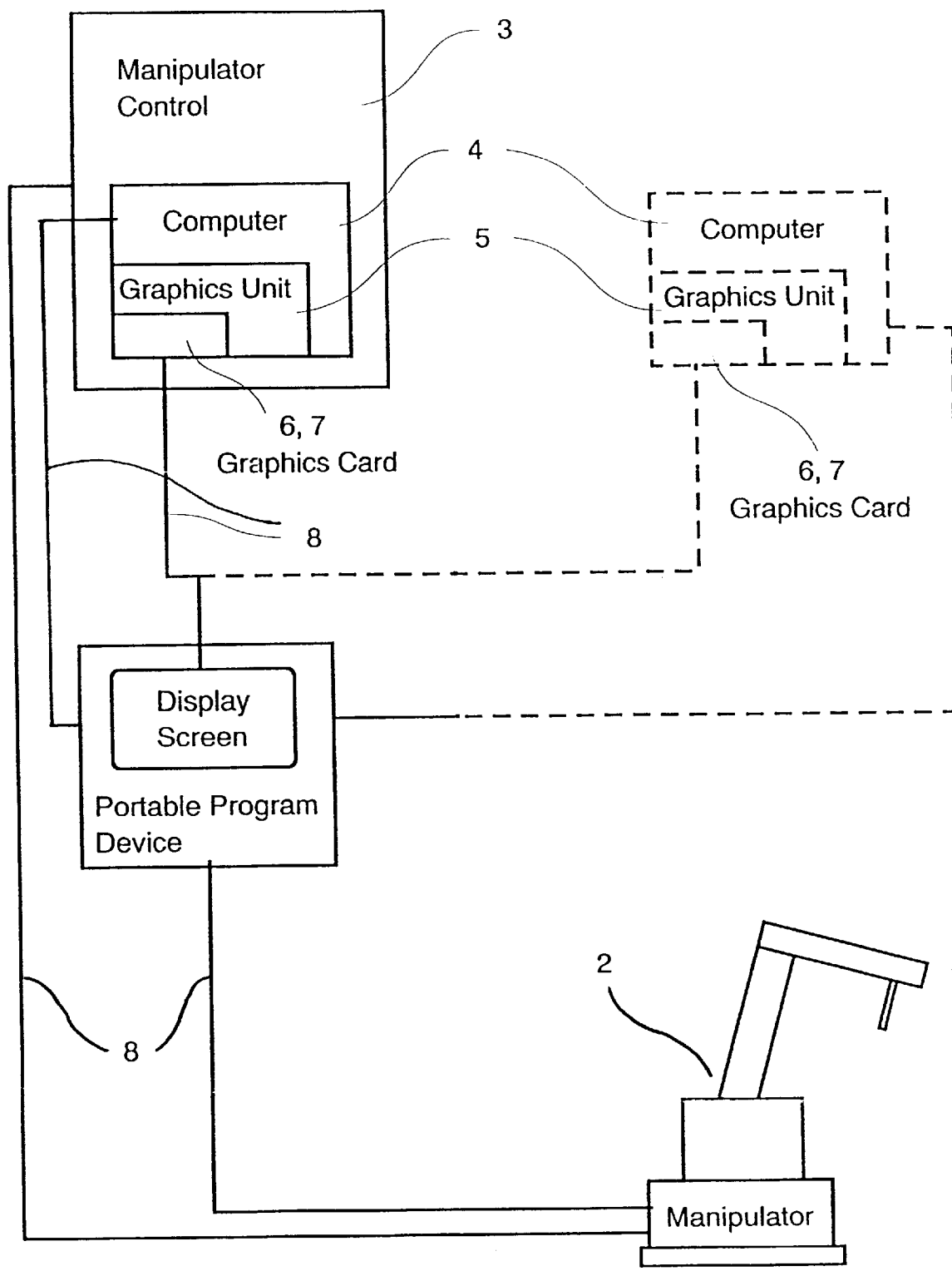

The present invention pertains to a control and programming means for a manipulator with the features in the preamble of the principal claim.

Control and programming means of this type have been known from practice. They comprise a manipulator control and a computer with a graphics unit, as well as a portable programming device. The programming device is connected to the computer via cables. This arrangement makes it possible to control and program the manipulator, which is frequently located at a great distance from the manipulator control, at its site of use with the portable programming device. The control and program data are transmitted from the programming device to the computer via the said cable connection, they are optionally processed by the said computer, and passed on to the manipulator control. The manipulator is in turn controlled by the said manipulator control corresponding to the preset program.

Prior-art programming devices have a limited comfort and benefit. They are equipped with simple display screens, which have a graphics unit of their own. The display screens have a limited scope of display and are frequently designed only as line displays. They can display basically only simple characters, such as letters or numbers. In addition, the display screen is monochrome and relatively small for reasons of handling. An actually desirable improvement and enlargement of the display screens has hitherto been thwarted by the associated weight problem. Such display screens require different, more expensive graphics units, which lead to a markedly higher weight. This makes operation difficult and is not ergonomic for longer-lasting programming sessions.

The prior-art programming devices are connected to the control box of the manipulator via a multiwire electric line and have otherwise hardly any other possibilities of communication. As a result, the operator is limited in the programming. Additional programming measures must be performed in the control box, as a result of which rather long distances must sometimes be covered. The handling is impractical and time-consuming as a result.

The object of the present invention is therefore to show a more suitable control and programming means.

The present invention accomplishes this object with the features in the principal claim.

The programming device in the control and programming means according to the present invention has a display screen without its own graphics card ["Grafikharte" in German original is probably a typo for "Graphikkarte"—Tr.Ed.], which markedly reduces the weight of the programming device. The display screen receives the graphic information needed for the display by remote data transmission from the graphics unit of the computer of the manipulator control. The graphics unit may operate both the display screen of the programming device and a possibly present display screen of the computer.

The design according to the present invention is of particular advantage if the programming device has a higher-quality display screen with larger area and more extensive display possibilities, especially a color display screen with graphics capabilities. The more complex the image contents to be displayed, the more complicated and heavier would the graphics card normally needed for this become. The advantages of the present invention are especially obvious in this case.

The graphics unit in the computer preferably has an interface of its own for remote data transmission, via which it transmits the pure data needed for directly generating the image, i.e., the pixel information in the case of the modern pixel display screens, to the display screen of the programming device. This is, e.g., the color information red/green/blue and the pixel position for a color display screen.

The graphics unit in the computer preferably has suitable hardware for image generation, especially a graphics card. This may be arranged separately as an insert card or be integrated within the motherboard of the computer. The graphics information is preferably provided as parallel signals and is sent to the serial interface via a suitable parallel/serial converter.

The display screen of the programming device, which is preferably designed as a flat LCD color display screen, has an integrated pixel drive with a serial interface arranged before it and with an inserted converter, which converts the serially transmitted graphic information back into parallel signals for the display screen.

The programming device has extensive communications capabilities. It has one or more additional interfaces for connection to external input or output devices, e.g., keyboards or display screens, communications means, etc., and/or external computing units. The latter may be, e.g., laptop computers for programming purposes, etc. A separate interface with remote data transmission of its own may be present for the transmission of the graphic information. However, the arrangement may also be integrated within a more comprehensive interface, which is suitable and provided for the transmission of additional data, e.g., the control and program data.

The remote data transmission may take place in any suitable manner, i.e., via a cable, but also wireless, via radio, infrared or other transmission means. The interfaces preferably have electric contacts, but they may also have connection possibilities for other, e.g., optical, transmission means, e.g., fiber-optic cables.

The interfaces are preferably located recessed in the housing. They may have various designs and accommodate cable plugs, interface cards or other suitable communications means. The front and/or rear edge of the housing is a favorable place. The outlet for the connection cable to the manipulator or to its control is preferably also located in this area, unless it can be omitted because of the wireless remote data transmission. The design makes possible an extensively trouble-free and ergonomic handling and operation of the programming device. In addition, the interfaces and cables at these points are subject to little mechanical stress.

The programming device has two or more, preferably at least three or four ergonomically designed grip areas. Due to these different possibilities of gripping, the operator can frequently change the position of his hands, which effectively prevents fatiguing phenomena. In addition, the grip areas have an ergonomic design and facilitate a rather nonfatiguing position of the hands. The interfaces fit into this design favorably.

At least two and preferably three grip strips, which have an ergonomically especially favorable shape, are made in one piece with the housing edges in the preferred embodiment. At least part of the function keys are associated with the grip strips in the range of the fingers, so that the keys can be actuated comfortably, without the operator having to change the position of his hands or even to remove his hand from the device. The function keys are arranged on the top side of the housing in an ergonomically especially favorable manner and can be reached with the thumb. One or more switching keys, which are designed as, e.g., permission and/or start/stop keys, are located on the underside of the housing in the vicinity of the grip strips in a position favorable for gripping. It is also favorable for the switching keys and the function keys to be present in multiple numbers, so that the different functions provided can be performed from all gripping positions.

A projecting thumb ball pad is present at least at one of the grip strips in an ergonomically especially favorable manner. If a joystick is used as a multiaxially movable control member, it is recommended that it be arranged in the vicinity of the thumb ball pad and to let it project laterally. As a result, the control member can be comfortably reached and actuated from the grip strip, without the operator having to change his grip.

Besides the grip strips arranged at the housing edges, it is also recommended to arrange a grip pin on the underside of the housing. Two pins are preferably provided, and they act as desk supports with correspondingly beveled foot surfaces. As a result, the programming device can also be placed and operated in an ergonomically advantageous oblique position on a firm support. The arrangement of the interfaces on the rear side of the housing is especially favorable for this setup.

Additional advantageous embodiments of the present invention are described in the subclaims.

Figure 2:
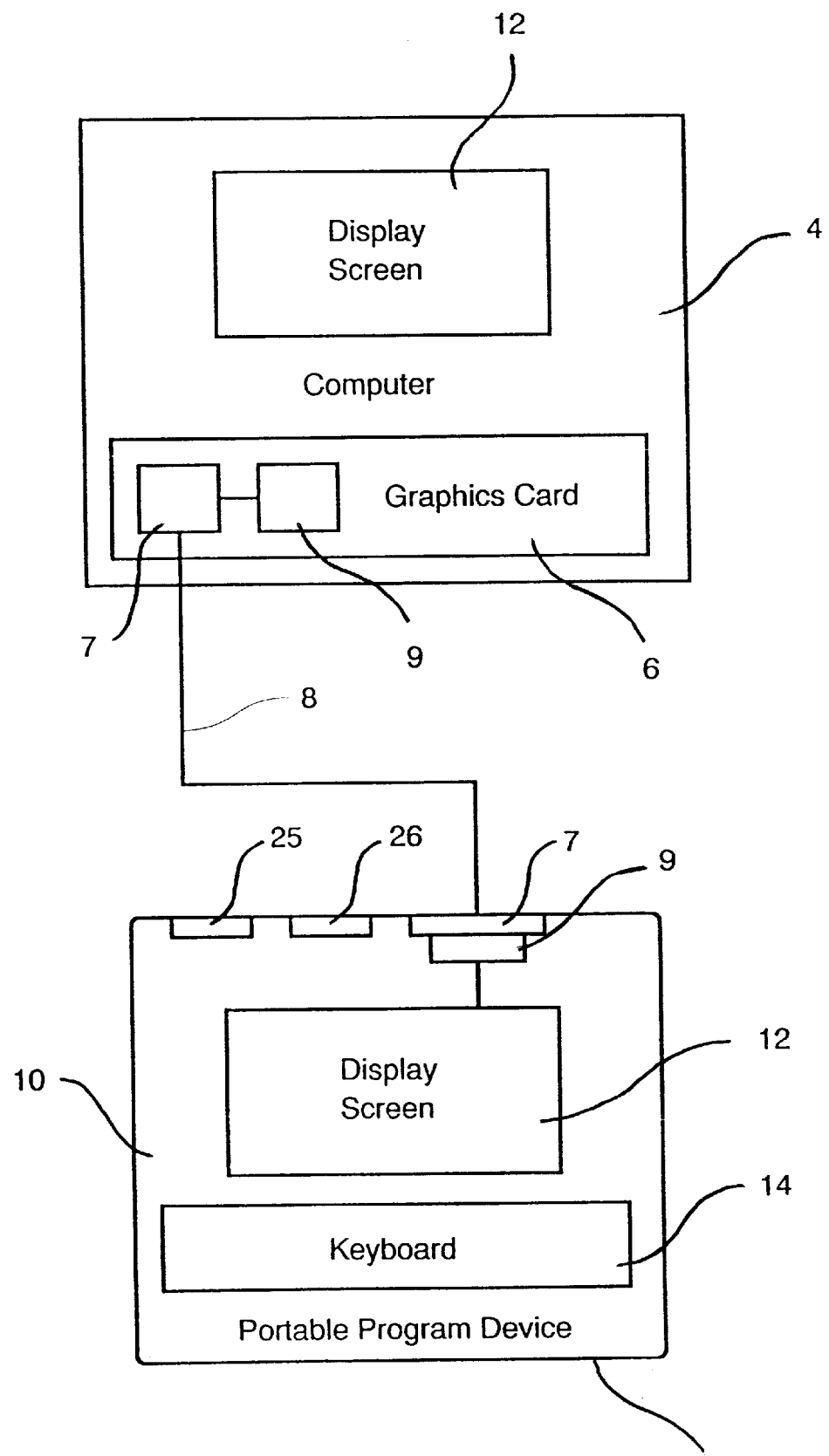
Figure 3:
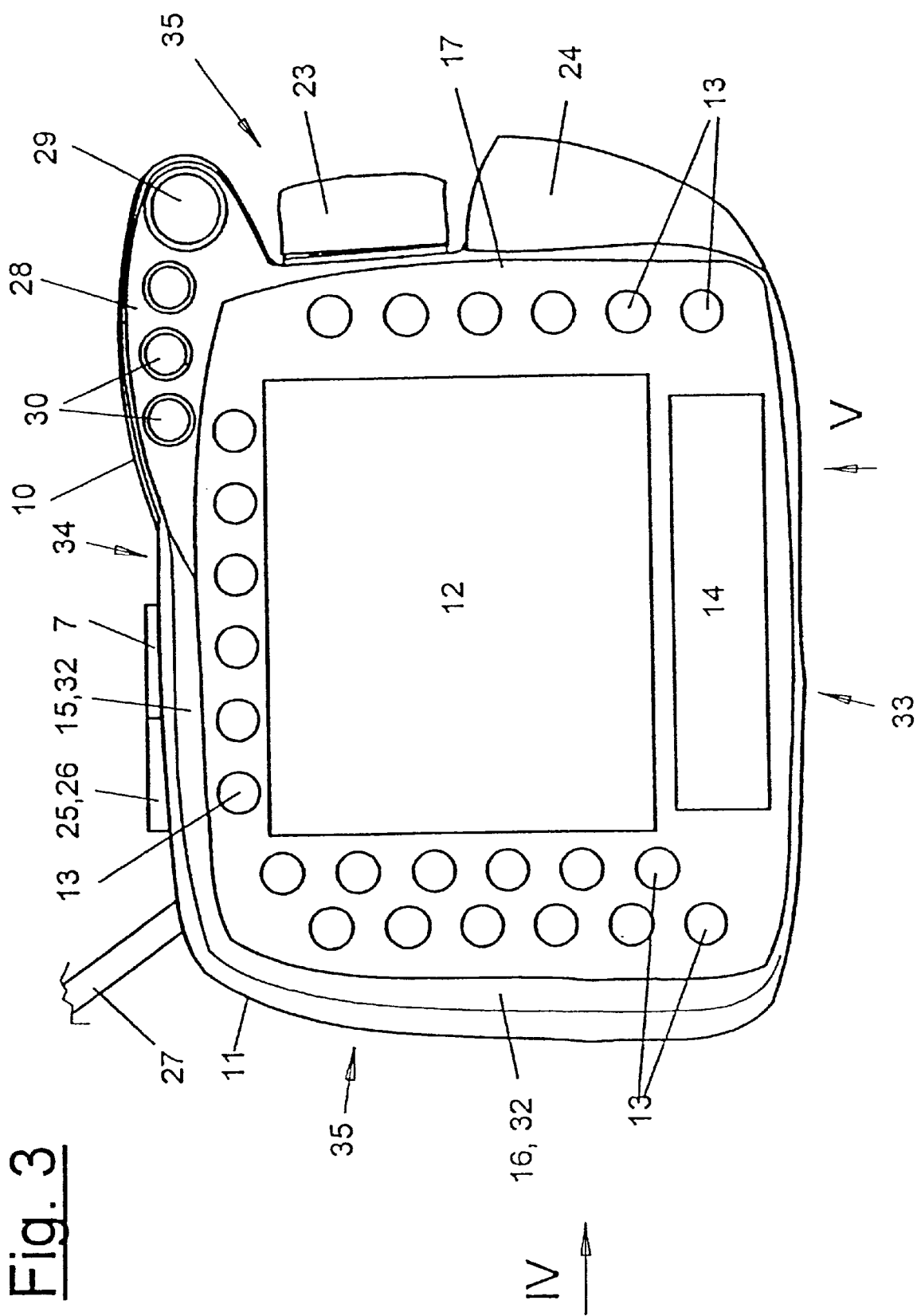
Figure 4:
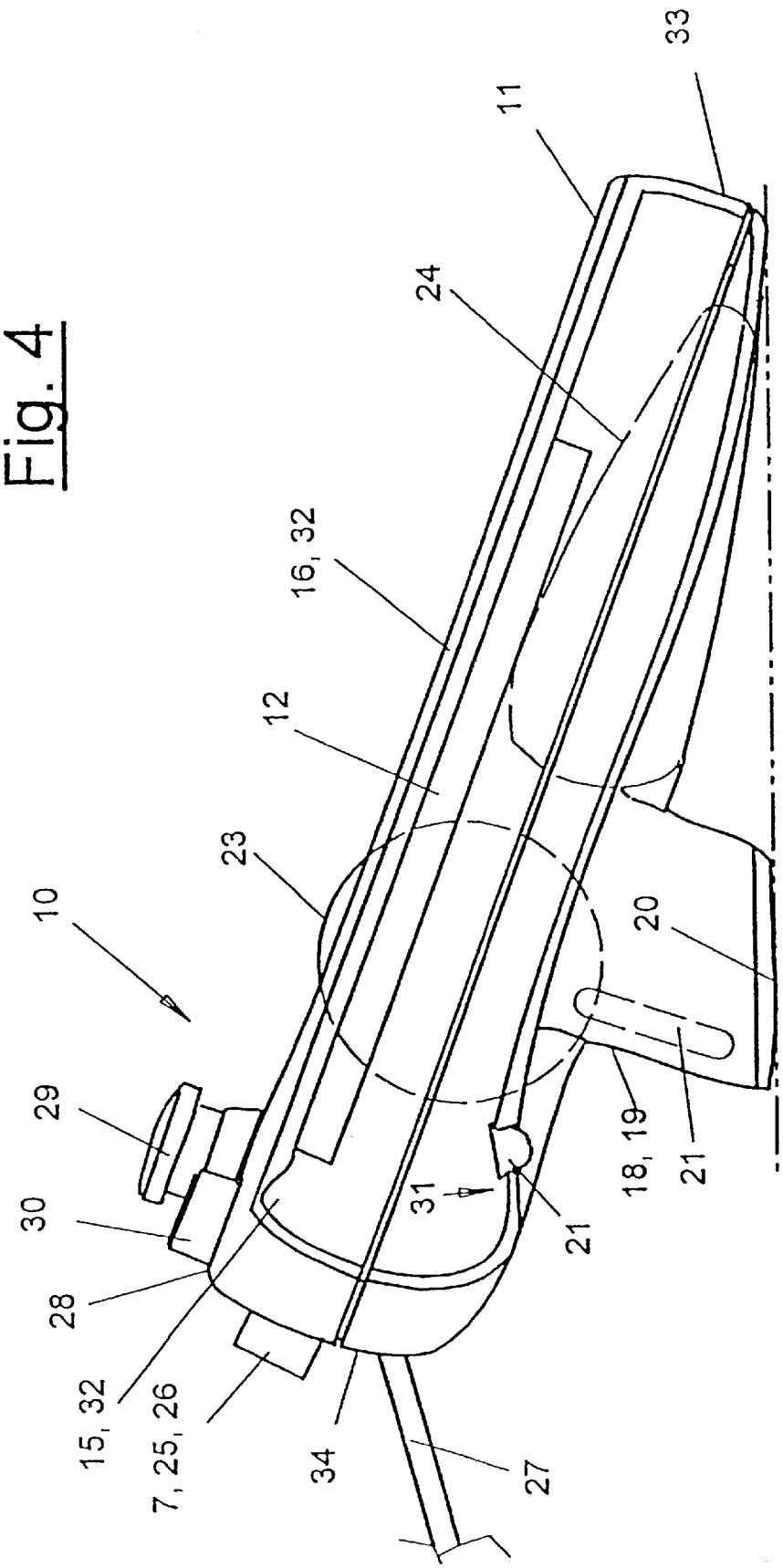
Figure 5:
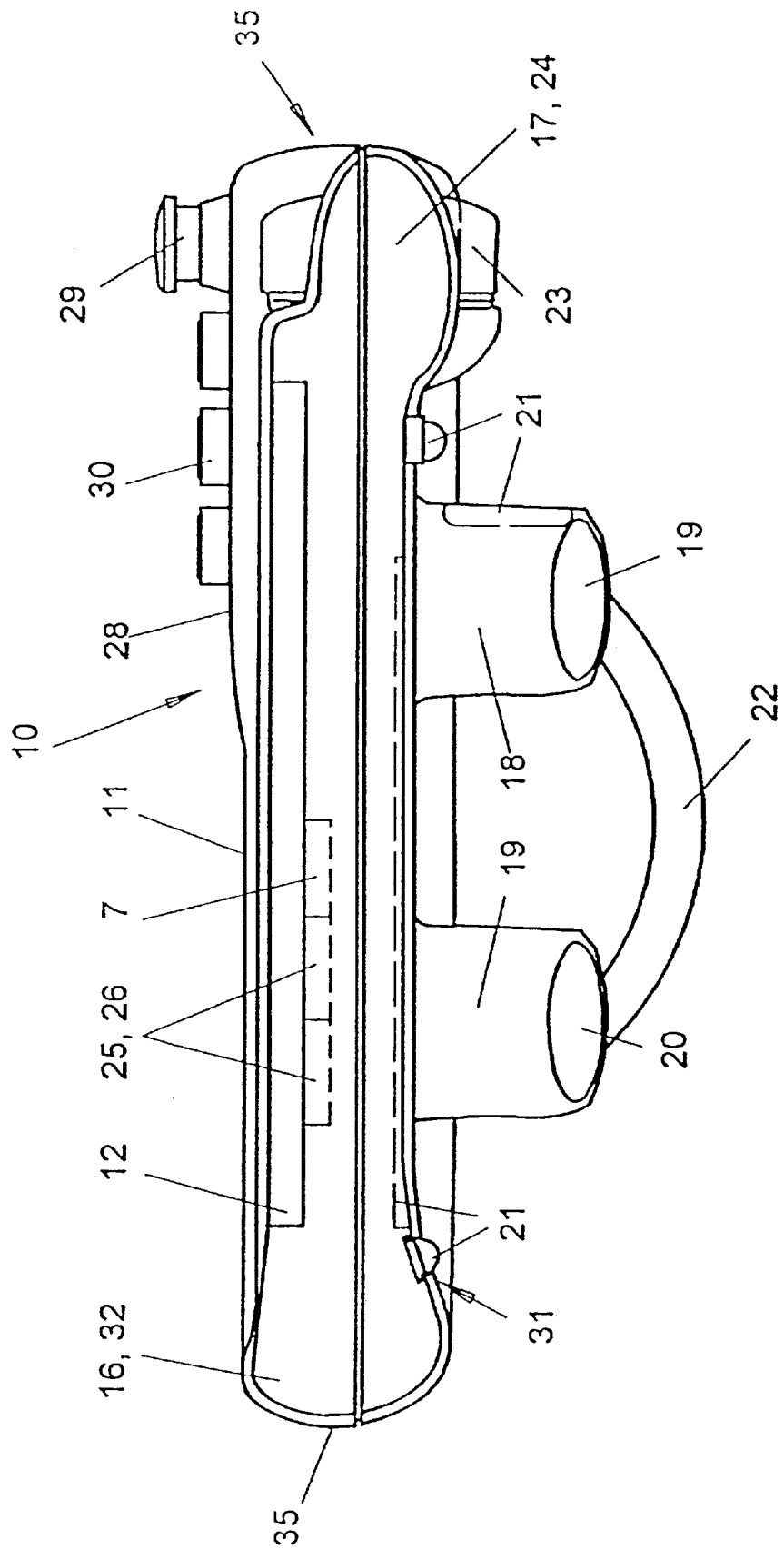
Figure 6:
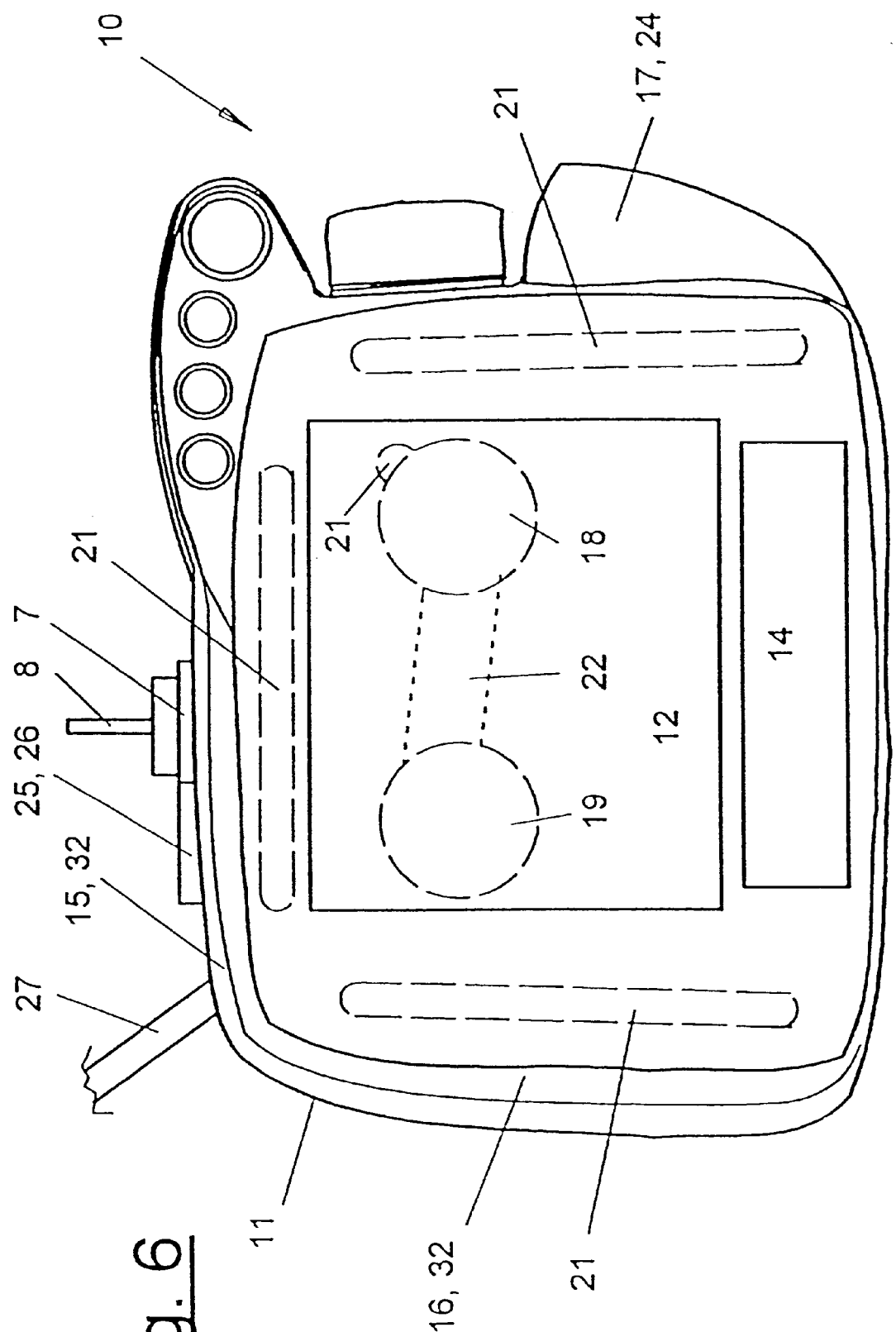

The present invention is shown in the drawings schematically and as an example. Specifically, FIG. 1 schematically shows an overview of the control and programming means in connection with a manipulator and a manipulator control, FIG. 2 shows a detail view of a computer and of a programming device, FIG. 3 shows a more detailed top view of the programming device, FIG. 4 shows a side view of the programming device corresponding to arrow IV in FIG. 3, FIG. 5 shows a front view of the programming device according to arrow V in FIG. 3, and FIG. 6 shows a simplified top view according to FIG. 3 with the underside of the programming device made visible.

FIG. 1 shows an overview of a control and programming means (1) for a manipulator (2), preferably a multiaxial industrial robot, along with a manipulator control (3). The manipulator (2) may be located at a distance of, e.g., 100 m or more from the manipulator control (3). A portable programming device (10), which is connected to the manipulator control (3) and possibly to the manipulator (2) via corresponding remote data transmission means (8), e.g., multiwire cables or lines, is provided for the remote control, control and programming of the manipulator (2). Furthermore, the manipulator (2) is also connected to the manipulator control (3) via such remote data transmission means (8).

A computer (4), e.g., a personal computer, which may have various designs, is provided to generate and process the control and program data. On the one hand, it is possible to integrate the computer (4) within the manipulator control (3). However, the computer (4) may also be an external device, e.g., a laptop computer, which in turn may be used as a mobile computer. To transmit the control and programming data, the programming device (10) may be connected to the computer (4) via remote data transmission means (8). The programming device (10) contains in its housing (11) a computing and control unit, not shown and described specifically, with which control elements to be described in detail later can transmit control commands to the manipulator (2) and/or the manipulator control (3). The manipulator (2) can be remote-controlled and programmed at its site of use via the programming device (10), and the operator can directly monitor and check the movements of the manipulator. The operator may move away with the programming device (10) from the manipulator (2) and operate the device from a safe location. Any desired teaching modes may be used via the programming device (10) during the programming of the manipulator control (3).

The programming device (10) has a housing (11) with a display screen (12), which is preferably designed as a flat LCD display. It may also be a display screen with active matrix. The display screen (12) has graphics capability and is preferably designed as a color display screen.

The display screen (12) in the programming device (10) is operated by the computer (4) by remote data transmission means (8). The computer (4) has a graphics unit (5), which consists of, e.g., a graphics card (6), which is designed as a separate card or is integrated on the motherboard of the computer (4). The graphics hardware may also be designed in another suitable manner. The graphics unit (5) has a preferably independent interface (7), with which the graphic information is transmitted to the display screen (12) of the programming device (10) by remote data transmission means (8). The computer (4) itself may also have a corresponding display screen (12), which is likewise operated by the graphics unit (5).

The serial interface (7) is preferably integrated on the graphics card (6) or the graphics unit (5) and is directly associated therewith. The graphic information of the graphics unit (5), generated as parallel signals, is converted into serial signals by a suitable converter (9) and is transmitted to the interface (7). The graphic information is preferably the driving signals, which a display screen needs for directly generating graphics. This is pixel information, especially color information red/green/blue, and the pixel position in modern display screens (12). The VGA display with a resolution of 640×480pixels is used in the preferred embodiment.

The display screen (12) in the programming device (10) has an integrated pixel drive. It is supplied directly with the graphics information transmitted from the graphics unit (5). A separate, complete graphics card in the programming device (10) may be omitted as a result. Individual, lightweight graphics elements for converting or processing the graphic information may be present, depending on the type of the display screen. To receive the graphic information, the display screen (12) also has a serial interface (7) with a converter (9) arranged downstream, which converts the serial signals into parallel signals.

The remote data transmission means (8) may have any suitable design. It is formed by two-wire or three-wire electric cable connections in the exemplary embodiment shown. However, wireless communications means, which transmit the data by radio, infrared light or another suitable manner, may also be connected to the interface (7).

Another design of the programming device (10) is shown in greater detail in FIGS. 3 through 6.

The programming device (10) has an essentially parallelepipedic, transversely lying housing with ergonomically rounded edges, which has three or more, preferably four ergonomically designed grip areas (15, 16, 17, 18). As a result, the operator can hold and operate the programming device (10) in different manners.

Grip strips (15, 16, 17), which are adapted to the shape of the hand and are made in one piece with or integrated within the housing (11), are located at two or more housing edges (34, 35). They have surfaces favorable for gripping, which are, e.g., roughened or provided with grooves. The grip strips (15, 16, 17) are located at the rear housing edge (34) and at the two lateral housing edges (35) in the preferred exemplary embodiment.

As is apparent from FIGS. 4 and 5, the rear and left-hand grip strips (15, 16) each comprise a strip-shaped hump (32) made in one piece with the top side of the housing and a corresponding recessed grip (31) located on the underside of the housing. The humps (32) are used to support the carpal region along with the ball of the thumb. The fingers grasp around the housing edges (34, 35) and are supported in the likewise strip-shaped recessed grips (31).

The grip strip (17) has a somewhat different design on the right-hand side (35) of the housing. It has a laterally projecting thumb ball pad (24), which is adapted to the shape of the hand and extends along the lateral housing edge (35). The thumb ball pad (24), which also forms a grip at the same time, expands increasingly starting from the front housing edge (33) and then tapers again. The level of the thumb ball pad (24) is somewhat lowered compared with the surface of the housing. A longitudinally extending recessed grip (31) is likewise located on the underside.

The fourth grip area (117) [sic—Tr.Ed.] is arranged on the underside of the housing and comprises a grip pin (18) (cf. FIG. 6). This [pin] projects vertically from the underside of the housing and is located in the right-hand half of the programming device (10). It is intended for the left hand, and the programming device (10) can be supported on the forearm of the operator. The arrangement of the grip strip (17) and of the thumb ball pad (24) and of the grip pin (18) may also be transposed to the other side of the housing for lefthanders, so that the programming device (10) can also be adapted for lefthanders by correspondingly redesigning the housing (11).

The operator can hold the programming device (10) in at least three [different] intended manners with the above-described grip areas (15, 16, 17, 18). On the one hand, he can grasp the lateral grip strips (16, 17) with both hands. He can also hold it with the left hand by the rear grip strip (15) and support it on the hip. The third possibility is the above-mentioned holding by the grip pin (18). Finally, the programming device (10) may also be placed on a support in a position that is ergonomically favorable for operation in the manner described below.

Most of the control elements of the programming device (10) are arranged on the top side of the housing (11). The display screen (12) is preferably located in the middle area. Under it is arranged, e.g., a keyboard, which may contain an alphanumeric keypad or typewriter keyboard and optionally additional control keys, such as cursor keys or the like.

The movements and/or functions of the manipulator are controlled predominantly by function keys (13), which are preferably arranged above and on both sides of the display screen (12). The function keys (13) are preferably arranged in one or two parallel rows, which extend in the vicinity of and along the grip strips (15, 16, 17). The function keys are arranged such that they are located within the reach of the fingers and can be easily and comfortably reached especially with the thumbs. Corresponding to the multiple arrangement of the grip areas (15, 16, 17), the function keys (13) may also be present in multiple numbers. The operator is thus able to trigger the same function in a plurality of areas and in different grip areas.

Switching keys (21), which are preferably arranged in the area of the recessed grip (31), are located at one or more grip strips (15, 16, 17) on the underside of the housing. These are, e.g., permission keys and/or start/stop keys. As is shown in FIG. 6, the switching keys (21) may consist of elongated switching strips or a plurality of shorter switching elements. One or more switching keys (21) are also arranged at the grip pin (18) within the reach of the fingers. A key (not shown) may optionally also be arranged in the area of the thumb.

The programming device (10) has a multiaxially movable control member (23), whose movements are transmitted to the translatory and rotary axes of the manipulator. The control member is designed as a six-axial joystick (23) for the six axes of the robot in the preferred embodiment.

The control member (23) is located at one of the two lateral housing edges (35) or lateral housing surfaces and can be reached from a grip strip (17) comfortably and without changing the grip. The control member (23) is preferably seated at a short distance behind the thumb ball pad (24) at the right-hand side (35) of the housing.

The control member (23) is arranged horizontally and projects laterally from the housing edge (35). It is directed essentially horizontally with its principal axis. The control member is designed as a joystick and has, contrary to the state of the art, a stump shape. The grip has no projecting shaft, but is seated directly at the lateral housing edge (35). The grip is thicker than in prior-art joysticks and has a cylindrical or roller shape, whose shape and size are adapted to the concave shape of the hollow, slightly arched hand.

In the 6-D version, the joystick (23) may be rotated or tilted around the three space axes and also be displaced translatorily around the three space axes. The hand of the operator is supported on the thumb ball pad (24) in the process, and the grip roller of the joystick (23) can be grasped and actuated with the thumb, index finger and middle finger. The operator can hold the device with the right hand via the grip strip (17) and the thumb ball pad (24) and operate the joystick at the same time. In addition, he can also reach and actuate the adjacent function keys (13) with the thumb at the same time. Changing the grip is not necessary.

The control member (23) may be switched over and possibly programmed in terms of the dimension of the movement and the use. As a result, it may be used as a mouse, with which, e.g., the cursor can be moved on the display screen (12), in the case of a 2-D switchover. In the case of a 1-D switching, the control member (23) may be used as a programmable movement or setting controller or key for setting a parameter. Thanks to the grip strip (17) or thumb ball pad (24), the control member (23) can be held motionless and be moved with the needed sensitiveness and precision.

A housing attachment (28), which extends to the rear, projects laterally and extends over the control member (23) from the rear, is arranged preferably at the right-hand, rear housing edge (34). An emergency switch (29) and one or more switches (30) of the device are located on the housing attachment (28). These are preferably on/off switches for the manipulator or the robot control. A device switch (30) may also be a key-type switch for setting the mode of operation of the robot control or for other purposes.

A second, parallel pin (18) [sic—Tr.Ed.] is located next to the grip pin (18) on the underside of the housing, preferably at a laterally spaced location. A holding strap (22), with which the programming device (10) can be additionally fastened to the hand, may also be located on the underside of the housing. As is illustrated in FIGS. 4 and 5, the pins (18, 19) may have beveled foot surfaces (20), which are sloped toward the front side (33) of the housing. As a result, the programming device (10) may be placed on a desk or another firm support in an oblique position in the manner shown in FIG. 4.

Besides the above-mentioned interface (7) for the graphic data, the programming device (10) preferably also has one or more additional electric interfaces (25, 26) for the connection of external communications means. These are preferably external input or output devices, e.g., a computer keyboard, a monitor, etc. The interfaces (7, 25, 26) may also be integrated within one unit.

The control commands for the movements of the manipulator are transmitted to the manipulator control (3), e.g., via the line (27). In addition, another data connection to the manipulator control (3), the computer (4) or another computing unit, especially a portable computer, may be created via the interfaces (7, 25, 26). As a result, more complex operations, e.g., calculations, the entry of additional programming data and their direct transmission to the robot control (3), can be performed on the programming device (10) on the site. The operator does not have to go to the control box (3) for this, but he can complete all control and programming tasks on the site and all at once. The hard line (27) may possibly be eliminated in this case.

The interfaces (7, 25, 26) may have electric plug contacts for cable plugs. In addition or as an alternative, they may have recessed slots with electric, optical or other contacts for interface cards. These may be, e.g., so-called PCMCIA terminals. Telecommunications means, e.g., radio or infrared transmitters, network cards, modems, etc., may also be connected to the interfaces (7, 25, 26) for communication with the control box, the robot control (3), a network, a higher manufacturing process control, etc. The line (27) may optionally be omitted.

The interfaces (7, 25, 26) may be arranged in any desired and suitable area of the housing (11). They are located at the front and/or rear housing edges (33, 34) and are recessed in the preferred embodiment. They are shown in the rear and projecting in FIG. 3 for clarity's sake. The interfaces (7, 25, 26) may be located under the housing attachment (28). It is also possible to place them in the grip area (15, 16, 17, 18). The interfaces (7, 25, 26) may optionally be present as multiple interfaces and be distributed over various areas of the housing (11).

The line (27) is located, e.g., at the front or rear housing edge (33, 34) and in the area of the left-hand corner. As a result, it is located outside the grip areas (15, 16, 17) and it does not interfere with any of the possible grip positions.

Various modifications of the embodiments shown are possible. Thus, fewer than the four grip areas (15, 16, 17, 18) described may be present. Also, function keys (13) need not be arranged at all grip areas in the manner described. The joystick (23) may be omitted in a simplified embodiment. Modifications are also possible concerning the display (12) and the keyboard (14), which may have a simpler design. Sturdier grip elements may be present instead of the strip-shaped humps (32) and recessed grips (31). The programming device (10) may have a carrying strap for hanging over the shoulder or the neck.

The programming device (10) preferably comprises very lightweight components in order to keep the overall weight and the load on the operator as low as possible.

LIST OF REFERENCE NUMBERS

1. Control and programming means
2. Manipulator
3. Manipulator control, control box
4. Computer, personal computer
5. Graphics unit
6. Graphics card
7. Interface
8. Remote data transmission means, line
9. Converter
10. Programming device
11. Housing
12. Display screen, LCD display
13. Function key
14. Keyboard
15. Grip area, grip strip
16. Grip area, grip strip
17. Grip area, grip strip
18. Grip area, grip pin
19. Pin, support foot
20. Foot surface
21. Switching key
22. Holding strap
23. Control member, joystick
24. Thumb ball pad
25. Interface, keyboard
26. Interface, PC
27. Line
28. Housing attachment
29. Emergency switch
30. Device switch
31. Recessed grip
32. Hump
33. Housing front side, front housing edge
34. Housing rear side, rear housing edge
25. Housing side, lateral housing edge

What is claimed is:

1. A robotic manipulator arrangement comprising:
    a manipulator control unit;
    a portable programming device including a display screen, said display screen of the portable programming device is a graphic color display screen, displaying image information as pixel information having an graphic integrated pixel control;
    a graphics unit in the manipulator control unit for direct image generation and providing color graphics image information in graphic form including color information and pixel position information;
    a parallel-serial converter in said manipulator control unit for converting said color graphics image information into serial signals;
    a serial interface in said manipulator control unit for transmitting said color graphics image information as serial pixels;
    a serial interface in said portable programming device for receiving said color graphics image information as serial signals;
    a serial-parallel converter in said portable programming device for re-converting said serial signals into parallel color graphics image information to be displayed on said graphic color display screen;
    remote transmission means for transferring said color graphics information from said control unit to said portable programming device, said graphic color display screen receives and displays said image information in said graphic form from said graphics unit in said manipulator control unit.

2. An arrangement in accordance with claim 1, wherein:
    said portable programming device does not include a graphics unit.

3. An arrangement in accordance with claim 1, wherein:
    said serial interface transmits said graphic form image information of said data from said control unit to said portable programming device.

4. An arrangement in accordance with claim 1, wherein: said graphics unit has a graphics card with a converter.

5. An arrangement in accordance with claim 1, wherein: said serial interface of said programming device is connected to said display screen via a converter.

6. An arrangement in accordance with claim 1, wherein: said display screen is a flat LCD display screen.

7. An arrangement in accordance with claim 1, wherein: said programming device includes a housing and said serial interface of said programming device is arranged recessed at said housing.

8. An arrangement in accordance with claim 7, wherein: said interfaces have one of electric plug contacts for cable plugs and slots with contacts for interface cards.

9. An arrangement in accordance with claim 7, wherein: communications means for wireless data exchange are connected to said interfaces.

10. An arrangement in accordance with claim 1, wherein: said programming device includes a housing with a plurality of ergonomically designed grip areas for gripping by a hand of a user.

11. An arrangement in accordance with claim 10, wherein: said grip areas are made in one piece with at least two housing edges;
a plurality of function keys are arranged within range of a finger of the hand gripping one of said grip areas.

12. An arrangement in accordance with claim 10, wherein:
said grip areas are arranged at one of a rear and two lateral edges of said housing.

13. An arrangement in accordance with claim 10, wherein:
a switching key is arranged on a side of said housing opposite said display screen and within range of a finger of the hand gripping one of said grip areas;
a multiaxially movable control member is arranged on a lateral edge of said housing.

14. An arrangement in accordance with claim 13, wherein:
said control member is designed as a six-axially movable joystick.

15. An arrangement in accordance with claim 10, wherein:
two projecting pins are arranged at spaced locations from each other on an underside of said housing, one of said projecting pins being designed as a grip pin for grasping by the hand.

16. An arrangement in accordance with claim 15, wherein:
said grip pin has a switching key and a holding strap.

17. An arrangement in accordance with claim 1, wherein:
said control unit includes a display, and said graphic form image information is also sent from said graphics unit to said display of said control unit;
said graphic form image information of said data can be directly used by said display screen of said programming device and said control unit;
said programming device is movable with respect to, and spaced from, said control unit.

18. An arrangement in accordance with claim 1, wherein:
said portable programing device is a separate structure from said manipulator control unit, and said portable programing device is movable with respect to said manipulator control unit.

19. A manipulator arrangement comprising:
a manipulator control unit;
a portable programming device portable with respect to said control unit, said programming device having a display screen with a plurality of pixels;
a graphics unit in said control unit for generating image data in a graphic form from non-graphic data, said graphic form of said image data including separate color and location information for each said pixel of said display screen to form an image;
data transmission means for transferring said graphic form image data between said control unit and said portable programming device, said display screen receiving and using said image data to display said image.

* * * * *